April 10, 1945. H. VOGT 2,373,279
HAND TRUCK
Filed Aug. 10, 1944 2 Sheets-Sheet 1

Inventor
HENRY VOGT

By Clarence A. O'Brien
and Harvey B. Jacobson
Attorneys

April 10, 1945.　　　　　H. VOGT　　　　　2,373,279
HAND TRUCK
Filed Aug. 10, 1944　　　　2 Sheets-Sheet 2
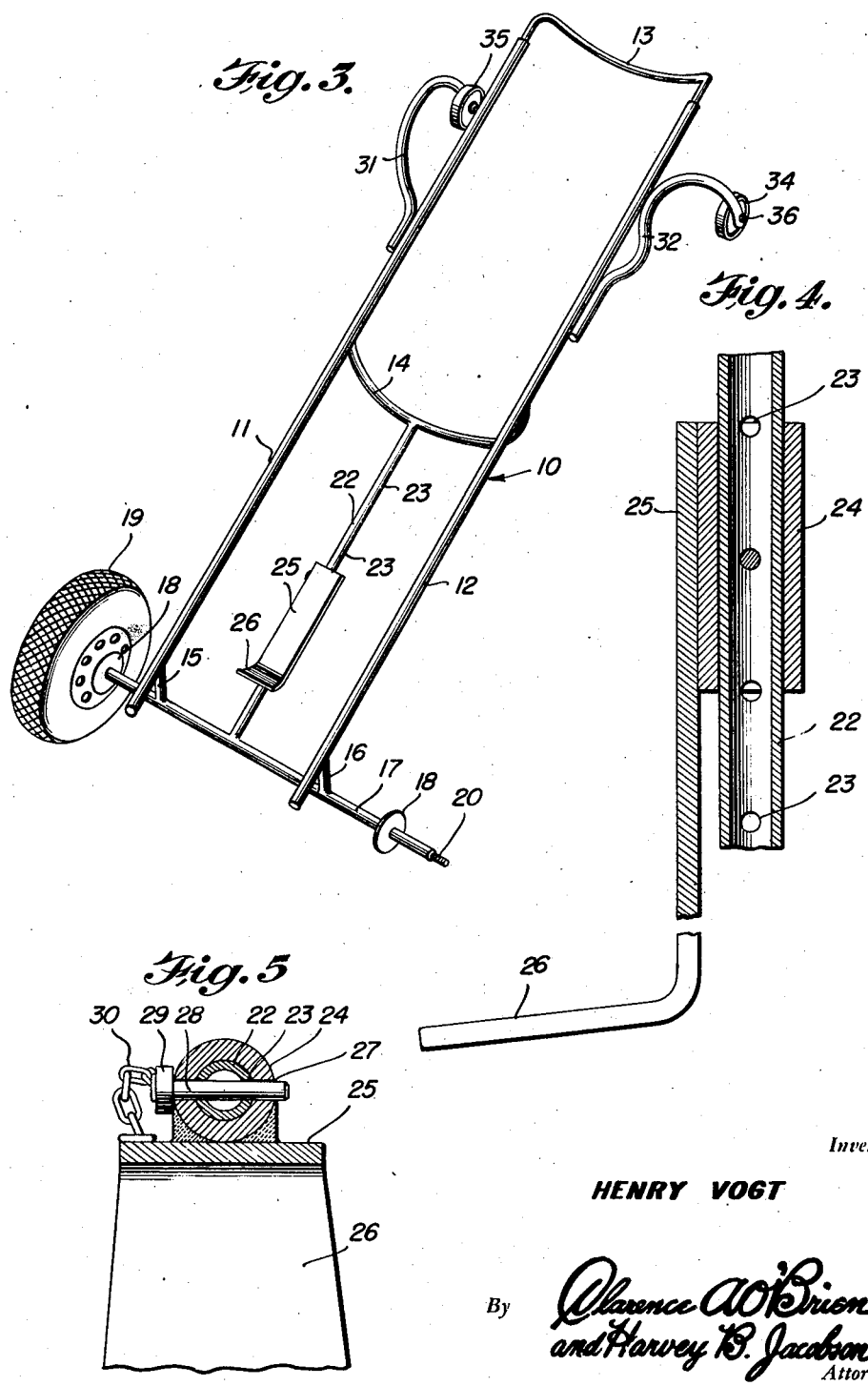
Inventor
HENRY VOGT Patented Apr. 10, 1945

2,373,279

UNITED STATES PATENT OFFICE 2,373,279

HAND TRUCK

Henry Vogt, Sacramento, Calif.

Application August 10, 1944, Serial No. 548,875

1 Claim. (Cl. 280—54)

This invention relates to hand trucks and more particularly to such a truck specifically adapted for the transportation and movement of cylindrical articles such as hot water heaters.

A primary object of this invention is the provision of an improved hand truck facilitating the movement, transportation, and handling of cylindrical objects, and more specifically, cylindrical objects such as hot water heaters provided with protruding legs.

A further object is the provision of such a device provided with means to accommodate such legged cylindrical objects having legs of different lengths.

A still further object is the provision of a wheeled truck having supplemental wheels on the handle portions thereof whereby the same may be positioned in horizontal alignment with the ground or other supporting surface to facilitate movement of the device through doorways and the like.

A still further object of this invention is the provision of outwardly flared handle members comprising additional supports for the device when the same is in horizontal position, the handle members being flared to provide a construction whereby the handles may be more easily grasped when an object such as a water heater is positioned on the truck.

A still further specific object is the provision of an improved locking mechanism whereby the means for accommodating water heaters with legs of various lengths may be securely retained in any desired position of adjustment.

Other objects reside in the combinations of elements, arrangements of parts, and features of construction, all as will be more fully pointed out hereinafter and shown in the accompanying drawings, wherein is shown a preferred embodiment of this inventive concept.

In the drawings:

Figure 3 is a perspective view of the device shown in Figures 1 and 2, certain operating parts thereof being removed to show certain other parts.

Figure 4 is an enlarged sectional detail view showing certain of the operating mechanism, and Figure 5 is an enlarged sectional view taken along the line 5—5 of Figure 1 as viewed from the top.

Like reference numerals refer to like parts throughout the several views of the drawings.

Figure 1:
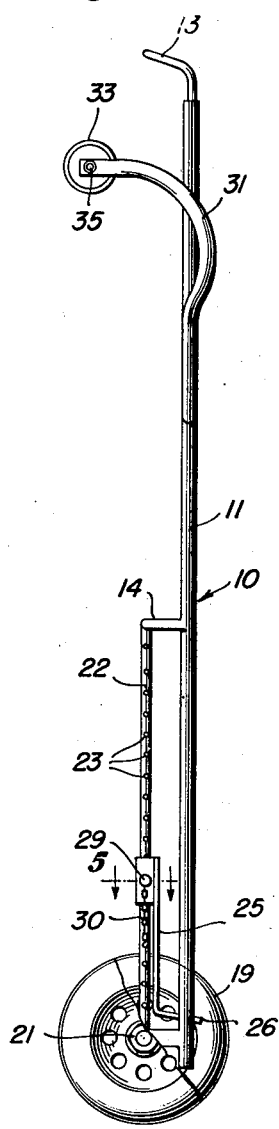
Figure 1 is a side elevational view of one form of this invention, certain parts thereof being broken away.
Figure 2:
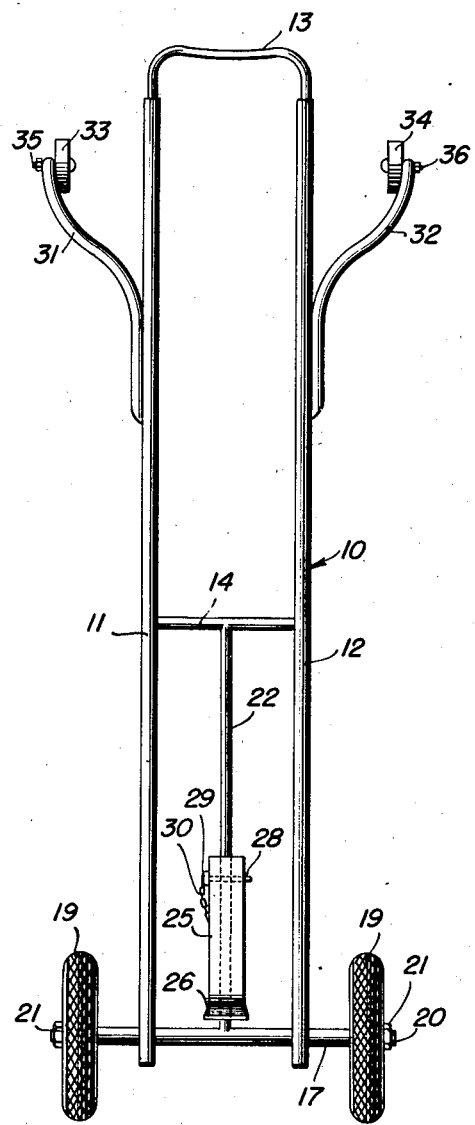
Figure 2 is a top elevational view of the device shown in Figure 1.

Having reference now to the drawings there is generally indicated at 10 a supporting frame comprised of two tubular side members 11 and 12 connected at the top by a concave tubular member 13 and at a mid-point by a second concave tubular member 14. Secured to each of members 11 and 12 adjacent their lower extremities and at right angles thereto, are a pair of depending members 15 and 16, respectively, to which, in turn, is secured a transverse axle 17, provided adjacent its opposite extremities with a pair of fixed flanges 18 to prevent the inward movement of a pair of wheels 19 rotatably mounted on axle 17. The outer ends of axle 17 are threaded as at 20 and wheels 19 are held in position thereon as by suitable nuts 21 engaging threaded portions 20. Extending between a mid-point of axle 17 and the mid-point of concave member 14 is a transverse tubular member 22, it here being pointed out that members 15 and 16 are of a length sufficient to place axle 17 in substantial lateral alignment with the lowermost portion of concave member 14. Tubular member 22 has a plurality of holes 23 bored therethrough at spaced intervals along its entire length. Member 22 has a circular sleeve or collar 24 positioned thereabout for slidable movement along the length thereof, to which is secured a plate 25 having an angularly disposed extension 26 at its extremities. Extending portion 26 is adapted, when a hot water heater is positioned on the truck, to abut the bottom of the heater and support the same in position. Sleeve 24 is provided with a pair of oppositely disposed aligned apertures 27 adapted to be positioned in registry with any of apertures 23 and tubular member 22. As best shown in Figure 5, a pin 28 having a head 29 is secured as by a chain 30 to the underside of plate 25, pin 28 being designed to pass through apertures 27 in sleeve 24 at any of apertures 23 to secure the plate 25 and its extension 26 in any of a plurality of desired positions at a predetermined distance from the ends of frame members 11 and 12, to accommodate water heaters having legs of varying lengths. Secured to the upper portions of frame members 11 and 12 in any desired manner, as by welding or riveting, are a pair of curved handle members 31 and 32, respectively. These handle members are, as best shown in Figure 2, flared outwardly away from frame 10 to provide easier access to the ends thereof to facilitate handling of the truck. They are also, as best shown in Figure 1, curved downwardly and have secured to their extremities wheels 33 and 34 mounted for rotation on axles 35 and 36 journaled in the ends of the handle members, the arrangement being such that when the truck is supported by wheels 19 and wheels 33 and 34 the frame 10 is substantially horizontal or parallel to the supporting surface of the device.

From the foregoing, the method of using the device should now be readily understandable. Plate 25 and its extension 26 are first positioned at a suitable point along transverse tubular member 22, such point being determined by the length of the water heater to be carried thereby, and pin 28 passed through apertures 27 and the selected apertures 23 to retain the same in the selected position. Extension 26 is then passed under the base of the water heater and the truck tilted back to support the same in the manner of a conventional hand baggage truck. The heater, now mounted on the truck, may then be moved to any desired location for any desired purpose, such as installation. In the event that it is necessary to pass the truck through a restricted opening, the device may be lowered to horizontal position and supported on wheels 33 and 34 as well as wheels 19, and pushed or pulled through an opening of relatively small size. Likewise, if it is desired to leave the heater on the truck the same may be lowered to horizontal position and allowed to remain there as long as desired without the possibility of overturning the device.

It will now be seen that by using the device of the instant invention one man may move and install a water heater with comparative ease, a task which without the device of the instant invention formerly took the services of at least two men. It will also be seen that the water heater or analogous article may be moved directly to the location desired without scratching or marring of floors or furniture. It will also be seen that the device herein described and shown in the accompanying drawings accomplishes all the objects of this invention and others including many advantages of great practical utility.

As many embodiments may be made of this inventive concept and as many modifications may be made in the embodiment hereinbefore shown and described, it is to be understood that all matter herein is to be interpreted merely as illustrative and not in a limiting sense.

Having described the invention, what is claimed as new is:

In a device of the character described, in combination, a pair of side members, a plurality of concave members connecting said side members, a depending member extending from each of said side members, an axle secured to said depending members, wheels mounted on said axle, a transverse member extending parallel to said side members between said axle and one of said concave members, a supporting plate secured to a sleeve having an aperture therethrough slidably mounted on said transverse member, said transverse member having a plurality of apertures therethrough, means, including a pin flexibly connected to said plate and adapted to pass through said first-mentioned aperture and a selected second aperture for securing said supporting plate at one of a plurality of points on said transverse member, outwardly and downwardly flared handle members secured to said side members, and wheels rotatably mounted at the ends of said handle members in substantial horizontal alignment with said first-mentioned wheels.

HENRY VOGT.